United States Patent

[11] 3,549,028

| [72] | Inventors | Karl Neumann<br>Michelbach;<br>Wilhelm Schoen, Wiesbaden, Germany |
|---|---|---|
| [21] | Appl. No. | 770,491 |
| [22] | Filed | Oct. 25, 1968 |
| [45] | Patented | Dec. 22, 1970 |
| [73] | Assignee | Passavant-Werke, Michelbacher Hutte<br>Near Michelbach, Nassau, Germany<br>a corporation of Germany |
| [32] | Priority | Nov. 3, 1967 |
| [33] | | Germany |
| [31] | | No. 1,634,142 |

[54] MOBILE SCREEN RAKE MACHINE
9 Claims, 4 Drawing Figs.

[52] U.S. Cl. .................................................. 214/41,
210/159
[51] Int. Cl. ..................................................... B65g 67/04

[50] Field of Search........................................... 214/41,
620; 210/159

[56] References Cited
UNITED STATES PATENTS
2,904,181  9/1959  Baker et al..................... 210/159
2,007,592  11/1961  Adams .......................... 214/620

*Primary Examiner*—Robert G. Sheridan
*Attorneys*—Dirk J. Veneman, John S. Munday and Gerald A. Mathews

ABSTRACT: A screen rake machine for cleaning bar screens in sewage treatment plants, hydroelectric power plants, or the like, is completely mobile and is provided with means for operatively aligning it with differently located bar screen installations in order that a plurality of said installations can be serviced by the same machine.

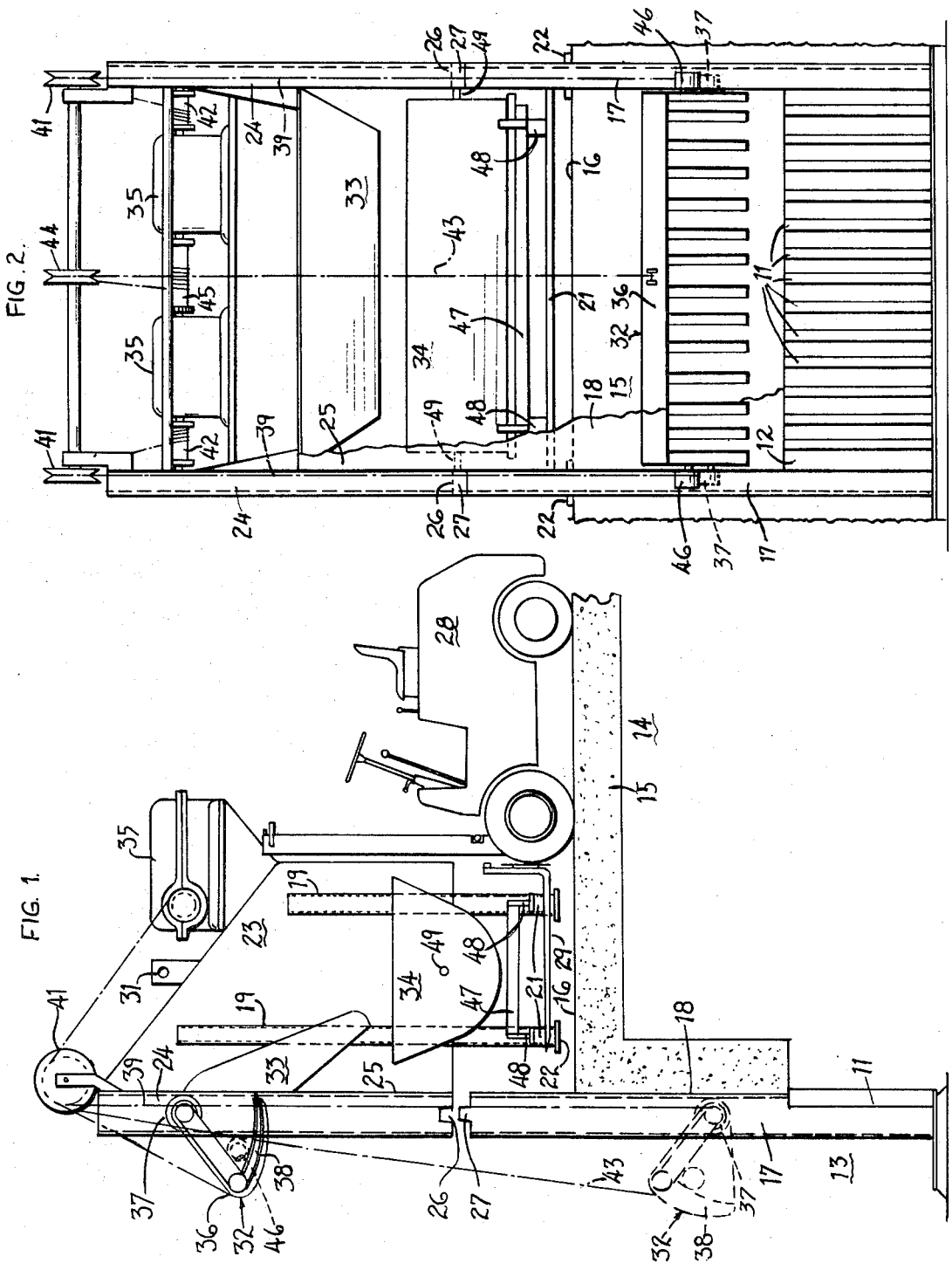

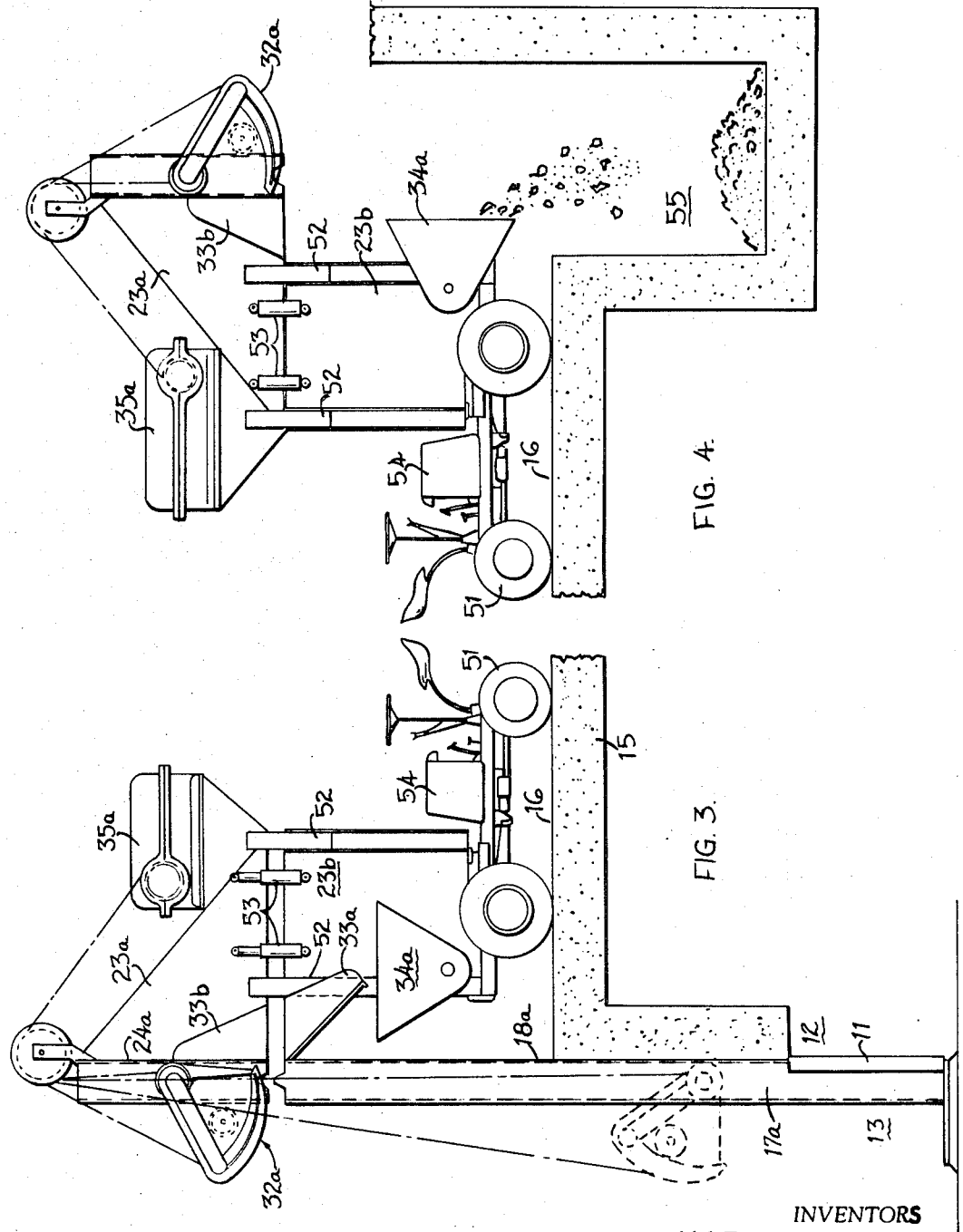

3,549,028

MOBILE SCREEN RAKE MACHINE

BACKGROUND OF THE INVENTION

Field of the Invention

The present invention relates to screen rake machines for removing debris from bar screen type trash racks in sewage treatment plants, hydroelectric power plants, etc. and more particularly to such machines adapted to service a plurality of bar screen installations.

In many types of installations which treat or utilize large quantities of water, a trash rack in the form of a bar screen, comprising a plurality of vertical spaced bars, is employed to intercept floating debris. Periodically, such debris obviously must be removed in order to preserve the desired rate of flowage through the bar screen. For this purpose, it is well known to employ a screen rake comprising a plurality of fingers adapted to extend between the screen bars and to drag debris upwardly into a discharge chute as the device is raised along the screen. In many such installations, the rake element is guided between two vertical guide members at its opposite ends and remains at all times supported between those members. In plants incorporating a number of bar screens or a single screen too wide to be served by a single rake member, it is also known to mount a raking unit on rails running along an apron above the screens, whereby the rake member can be moved into different operative locations to service different screens or different portions of a single screen. Although this type of arrangement can be less expensive than the corresponding plurality of permanently located raking units, the attendant rail and carriage structure may pose serious maintenance problems, particularly since it is almost invariably subject to occasional flooding. Also, the cost of such an installation can become prohibitive if the rail mounted machine must service widely separated screens, particularly if their disposition is such as to require other than simply a straight rail route. Furthermore, mounting a raking machine on such rails implies than that an appropriate disposal receptacle must be provided along the rails to receive accumulated debris from the raking unit. Also, unless a special building is provided along the rail path to house the machine, it is continuously exposed to the elements and may present a hazardous obstacle, particularly if children are apt to be present.

SUMMARY OF THE INVENTION

The present invention contemplates a completely portable screen rake machine adapted to be moved from place to place by a universally steerable transporting unit, thereby allowing the machine to service a plurality of screens, to be emptied at any convenient location, and to be stored in a building regardless of the proximate relation thereof to such screens. More particularly, the subject screen raking machine is adapted to clean screens by means of a raking member of the type that fits between two vertical guide members permanently installed at opposite sides of each screen. Incorporated in the machine, per se, are a corresponding pair of vertical guide members adapted to mate with and provide upward extensions of those permanently associated with each screen. When the rake member is raised, it is carried by these upper members, which in turn can be disengaged from the fixed lower guide members to allow universal movement of the entire machine. Also, the machine includes a self-emptying hopper for receiving the debris removed from the screens by the rake member, whereby the entire machine can be moved periodically to any convenient location to dispose of such materials. Preferably, the motive unit of the subject screen raking machine comprises a conventional lift truck or portable crane, which can serve other functions when not being employed for that purpose, but the motive unit may also be permanently incorporated in the machine if desired.

Various means for practicing the invention and other advantages and novel features thereof will be readily apparent from the following detailed description of the illustrative preferred embodiments thereof, reference being made to the accompanying drawings in which like reference numerals refer to like elements.

BRIEF DESCRIPTION OF THE DRAWINGS

In the drawings:

FIG. 1 is a partially cross-sectioned side elevational view of a preferred embodiment of the subject screen raking machine adapted to be transported by a conventional lift truck;

FIG. 2 is an end elevational view of the structure depicted in FIG. 1 but wherein some of the elements have been moved with respect to their position in FIG. 1;

FIG. 3 corresponds generally to FIG. 1 and depicts another embodiment of the invention incorporating an integral transporting structure; and FIG. 4 corresponds to FIG. 3 and depicts the illustrated machine in the process of dumping accumulated debris from the debris receptacle incorporated therein.

DESCRIPTION OF THE ILLUSTRATIVE PREFERRED EMBODIMENT

Referring first to FIGS. 1 and 2 of the accompanying drawings it will be seen that a typical bar screen comprises a plurality of vertical parallel bars 11 located across an opening 12 between the fore bay 13 and the enclosed flume 14 of the installation in question. Above the flume, a concrete apron 15 provides a flat generally level roadway surface 16. The bar screen is straddled by a pair of opposed vertical lower guide channels 17 which remain permanently in place. Above the bar screen, a lower shroud plate 18 extends to the top of the lower channel members.

The screen cleaning machine illustrated in FIGS. 1 and 2 comprises a main frame including upright structural members 19 connected by cross bars 21 above the feet 22 at the lower ends of the structural members, such feet being adapted to rest on the roadway surface. Vertical end plates 23 are welded or otherwise attached to members 19 at both ends of the machine and, in turn, support vertical upper guide channels 24 which are spaced apart by the same distance as lower guide channels 17. An upper shroud plate extends between the upper channel members, as shown at 25. The bottom ends of the upper guide channels are provided with notches 26, which are overlapped by the corresponding end plates and adapted to mate with corresponding tenons 27 at the tops of the lower guide channels when the feet of the machine are resting on the roadway surface; whereby the upper guide channels comprise upwardly extending continuations of the lower ones. In FIG. 1, the feet 22 are located slightly above the roadway 16, and hence notches 26 of upper guide channels 24 are shown spaced slightly above tenons 27. For contrast, in FIG. 2, feet 22 are resting on roadway surface 16 and notches 26 are fully mated with tenons 27. Thus, it will be apparent that the entire machine can be moved into and out of its illustrated operative cooperation with the lower guide channels of different bar screens by means of a conventional self-propelled lift truck 28, the lifting forks 29 of which can be positioned below cross bars 21 to raise the machine so that notches 26 can disengage tenons 27. Alternatively, a lifting bar 31 extending between end plates 23 can be employed to allow the machine to be lifted and transported in the same manner by a conventional movable crane provided with a lifting hook. If desired, the feet of the machine may be provided with relatively heavy casters, not shown, so that the machine can be towed along the roadway after it is removed from engagement with the lower guide channels, which may be preferable to carrying it suspended from a crane hook.

The operative elements of the screen raking machine, per se, comprise a rake element 32, a dump chute 33, a debris hopper 34, and a winch unit 35. The rake element 32 includes a housing 36 supported at its opposite ends by guide wheels 37 riding in the guide channels and is provided with a plurality of spaced rake teeth 38 aligned with the corresponding spaces between the screen bars. Lifting cables 39 extend upwardly from the axles of guide wheels 37 and over guide sheaves 41 to simultaneously rotatable winch drums 42, which are reversibly driven by appropriate drive means to effect raising and lowering of the rake element. To avoid accidental damage to the machine, an interlock device, not shown, can be provided to prevent the rake element from being lowered from its raised position by the winch unit except when the upper and lower guide channels are properly mated with each other. A centrally located rocking cable 43 is attached to rake housing 36 and extends over sheave 44 to another reversible drum 45 on the winch unit, which can be driven independently of drums 42. By this means, which is typical of previously known screen raking devices, the rake element can be lowered to the bottom of the bar screen in the position shown in broken lines in FIG. 1 and in solid lines in FIG. 2 and then rocked about the axis of wheels 37 until the device is oriented, relative to the wheel 37, as shown at the top of FIG. 1 in solid lines so that the rake teeth enter between the screen bars to a depth limited by the engagement of guide rollers 46 with the adjacent faces of the guide channels. While the rake element remains in the latter position, it is raised by cables 39. As long as the rake teeth are adjacent the shroud plates, the debris collected by the teeth remain in the raking element. When the raking element arrives at its uppermost position, however, the rake teeth are beyond the upper shroud plate 25, thereby allowing collected debris to be dumped out of the raking element and into dumping chute 33. Rake emptying means, not shown, can of course be provided to insure positive emptying of the debris from the raking element into the dump chute. Hopper 34 is located below the lower end of chute 33 and therefore receives all of the debris collected by the rake element. This hopper is carried by its own support frame 47, which is provided with support feet 48 adapted to rest on cross bars 21, thereby allowing the full hopper to be removed from the machine by the fork truck. Lifting trunnions 49 also can be provided at the ends of the hopper to facilitate tilting it to an emptying position while it is supported by a corresponding pair of support members at the disposal site.

The embodiment of the invention shown in FIGS. 3 and 4 is generally similar to the one described above except that the screen cleaning machine is permanently mounted on a self-propelled steerable vehicle 51. To reduce the weight that must be carried by this vehicle, the permanently installed lower guide members 17a straddling the bar screen extend higher than those depicted in FIGS. 1 and 2 and are connected by a similarly extended shroud plate 18a which also supports the lower portion 33a of the dump chute. The end plates of the machine are split in horizontal alignment with the tops of the guide members to provide upper and lower plate members 23a and 23b, which are slidably connected together by vertical guide members 52. Hydraulic cylinders 53 or similar means connecting the upper and lower plate members allow the former to be raised relative to the latter so the upper and lower channels 24a and 17a can be mated together in the same manner previously described. When this has been accomplished, the upper portion 33b of the dump chute is likewise aligned with the lower portion thereof so that debris raised above the shroud plate 18a by rake element 32a is deposited in tiltable hopper 34a. The rake element, per se, is operated in the same manner previously described by means of winch unit 35a, which preferably derives its power from the engine 54 or equivalent power source of the vehicle carrying the machine.

When hopper 34a is full, the rake element is lifted to its uppermost position and the upper unit of the machine is raised to disengage the upper guide channels from the corresponding permanently installed lower guide channels. Thereupon, as illustrated in FIG. 4, the machine can be driven to a refuse receptacle 55 into which the hopper can be emptied. Although not depicted in the drawings, power operated ma means obviously can be employed to tilt the hopper between its loading and emptying positions shown respectively in FIGS. 3 and 4.

The invention has been described in detail with reference to specific preferred embodiments thereof, but it will be understood that variations and modifications can be effected within the spirit and scope of the invention as described hereinbefore and as defined in the appended claims.

We claim:

1. A bar screen cleaning machine comprising, a frame, said frame including a pair of opposed generally vertical upper guide rail means arranged to provide upper continuations of a similar pair of lower guide rail means which lower guide rails rail means are permanently positioned along said bar screen, a positioning means for removably positioning the said upper guide rail means of said frame relative to the lower guide rail means of the bar screen such that the upper and lower guide rail means form one operably continuous guide rail means, a rake member having formed thereon rake elements for raking the bar screen and guide elements for positioning the rake member for generally vertical movement along said guide rail means, moving means attached to said frame for raising and lowering said rake member along said guide rail means, and hopper means carried by the frame for receiving debris removed from said bar screen by said rake member, whereby said frame is capable of either being attached to a bar screen to form said continuous guide rail means for cleaning the bar screen or completely removed as a unit from the bar screen.

2. A bar screen according to claim 1, each of said upper and lower guide rail means being a pair of opposed generally vertical guide rails between which the rake member travels, the lower pair of guide rails being permanently located on opposite sides of the bar screen.

3. A bar screen according to claim 1, wherein said moving means comprises a winch means mounted on the frame, and cables extending from the winch means along said guide rail means and engaging the guide elements of the rake member.

4. A bar screen according to claim 1, said positioning means comprising a set of mating notch and tenon elements formed on abutting surfaces of the upper and lower guide rail means.

5. A bar screen cleaning machine according to claim 1 including support means removably mounting said hopper to said frame so that said hopper can be removed from said machine while the latter remains in said predetermined location relative to said bar screen.

6. A bar screen cleaning machine according to claim 1 in which said for frame includes a plurality of feet adapted to support said machine on a generally flat horizontal surface, and a lifting means comprising at least one horizontal crossbar member connected to said frame and disposed adjacent but in spaced parallel relation above said surface to permit said machine to be lifted by fork truck forks positioned below said crossmember between at least two of said feet.

7. A bar screen cleaning machine comprising in combination:
   a. a self-propelled steerable vehicle including a motive power supplying unit;
   b. a frame member permanently carried by said vehicle;
   c. a rake member;
   d. a pair of generally vertical opposed guide channels supporting corresponding ends of said rake member for vertical movement therealong;
   e. lifting means connecting said guide means to said frame member to effect relative vertical movement of said guide means relative to said frame member; and
   f. positioning means engageable with mating means located above and in predetermined fixed relation to a bar screen to position said machine at a fixed location relative to said bar screen whereby said guide channels are disposed directly above and comprise upwardly extending continuations of a similar pair of generally vertical channel members immovably mounted at opposite sides of said bar screen and projecting upwardly therefrom.

8. A bar screen cleaning device according to claim 7 including:

a. a hopper supported by said frame and adapted to receive debris removed from said bar screen by said rake element; and
b. hopper emptying means for dumping debris from said hopper while the latter remains supported by said frame.

9. A bar screen cleaning machine according to claim 7 in which said lifting means comprises a winch unit powered by said motive power supplying unit.